United States Patent [19]

Yau et al.

[11] 3,887,523

[45] June 3, 1975

[54] FIBER-FORMING COPOLYESTER COMPOSITIONS FROM BROMINATED ETHOXYLATED HYDROQUINONE

[75] Inventors: Chiou C. Yau; Irwin S. Schlossman; Herman F. Oehlschlaeger, all of Cincinnati, Ohio

[73] Assignee: Emery Industries, Inc., Cincinnati, Ohio

[22] Filed: June 24, 1974

[21] Appl. No.: 482,198

[52] U.S. Cl. ........... 260/47 C; 260/40 R; 260/40 P; 260/61; 260/DIG. 24; 260/860
[51] Int. Cl. ............................................. C08g 17/14
[58] Field of Search ............. 260/47 C, 61, DIG. 24

[56] References Cited
UNITED STATES PATENTS

| | | | |
|---|---|---|---|
| 2,762,789 | 9/1956 | Fisher et al. | 260/75 |
| 2,973,339 | 2/1961 | Muenster et al. | 260/47 |
| 3,234,167 | 2/1966 | Sweeny | 260/30.4 |
| 3,246,067 | 4/1966 | Boyer | 264/203 |
| 3,794,617 | 2/1974 | Mains et al. | 260/47 |

Primary Examiner—Lester L. Lee
Attorney, Agent, or Firm—J.D. Rice, G. A. Baracka

[57] ABSTRACT

Flame retardant copolyesters capable of being formed into fibers and filaments and which are thermally stable at temperatures up to about 350°C are obtained by the use of ethoxylated brominated hydroquinones.

8 Claims, No Drawings

FIBER-FORMING COPOLYESTER COMPOSITIONS FROM BROMINATED ETHOXYLATED HYDROQUINONE

BACKGROUND OF THE INVENTION

It is known to incorporate halogenated reactants, containing either chlorine or bromine, into polyesters to obtain flame retardant copolyester compositions. Useful halogenated materials contain either hydroxyl or carboxyl functionality which allows reaction with the other reactants or polymer intermediates present in the system during the polymerization. It is also recognized that brominated compounds are more effective flame retardants than the corresponding chlorinated materials.

There are, however, serious drawbacks associated with the use of brominated materials for the formation of high molecular weight copolyesters suitable for use as fibers and filaments. Because of the high temperatures required during the polymerization to obtain the high molecular weights required, generally in excess of about 250°C and often as high as 320°C, brominated materials have typically proven unsatisfactory for the production of fibers and filaments and have therefor been limited to use in unsaturated polyester resinous materials, such as obtained with maleic acid or anhydride, where much milder reaction temperatures (less than 200°C) can be employed. At higher temperatures brominated materials tend to decompose and impart undesirable discoloration to the copolyester. With many known brominated hydroxylic and carboxylic materials this decomposition is so pronounced at the temperatures of polymerization that the physical properties of the polymer are adversely affected. Even if this does not occur, objectionable discoloration will result. Depending on the extent of breakdown of the brominated material the flame retardant capacity of the copolyester may also be drastically reduced.

SUMMARY OF THE INVENTION

We have now quite unexpectedly discovered that brominated ethoxylated hydroquinones are useful for the preparation of fiber-forming copolyesters - that the resulting flame retardant copolyesters have excellent initial color and heat stability. Ethoxylated dibromo-, tribromo- and tetrabromohydroquinones, also referred to as ethoxylated polybromohydroquinones, are readily reacted into the polyesters and are capable of withstanding the temperatures encountered during the final stages of the polymerization. Accordingly, the resulting copolyester products have excellent color, physical properties and flame retardance and are capable of being further processed or subjected to temperatures up to about 350°C with little or no loss of bromine and accompanying decomposition. The ethoxylated polybromohydroquinones of this invention are incorporated into the polyester using known polymerization techniques. The reactants, including the ethoxylated brominated hydroquinone, can be reacted as a unit charge or the brominated material can be reacted with a prepolymer or it can be added directly to the reactor at any stage during the polymerization. In all instances, flame retardant high molecular weight fiber-forming copolyesters having little or no initial discoloration and which are thermally stable at temperatures up to about 350°C are obtained.

The copolyesters will contain from about 1 to about 25% by weight of the ethoxylated brominated hydroquinone. The useful brominated compounds of this invention have the general formula

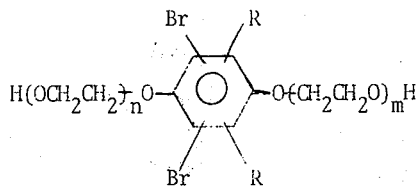

where $n$ and $m$ integers from 1 to about 4, and preferably $n=m=1$, and R is bromine or hydrogen.

DETAILED DESCRIPTION

The present invention relates to the use of brominated ethoxylated hydroquinones or ethoxylated brominated hydroquinones (hereinafter used interchangeably) in the preparation of copolyesters suitable for use as fibers and filaments. The resulting copolyester compositions in addition to being flame retardant have excellent physical properties, color and heat stability. Ethoxylated brominated hydroquinones used for the present invention have the general formula

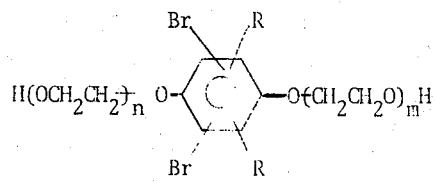

wherein R is bromine or hydrogen and $n$ and $m$ are integers from 1 to about 4. In a preferred embodiment of this invention n and m are the same and equal to one. Especially useful compounds of this invention include 1,4-di(2-hydroxy-ethoxy)-2,5-dibromobenzene (also referred to as 2,2'-(p-2,5-dibromophenylenedioxy)diethanol or 2,5-dibromohydroquinone di-($\beta$-hydroxyethyl)ether), 1,4-di(2-hydroxyethoxy)-2,3,5-tribromobenzene and 1,4-di(2-hydroxyethoxy)-2,3,5,6-tetrabromobenzene, said compounds having the respective structural formulae:

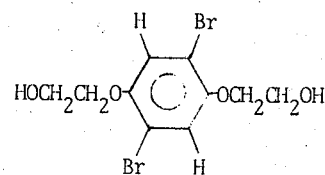

(hereinafter referred to as ethoxylated dibromohydroquinone);

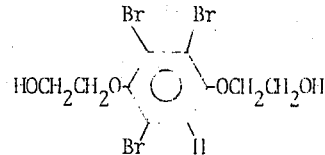

(hereinafter referred to as ethoxylated tribromohydroquinone); and

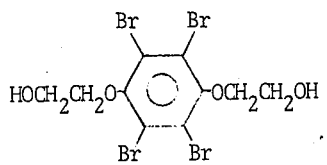

(hereinafter referred to as ethoxylated tetrabromohydroquinone). It will be understood by those skilled in the art that mono-brominated materials may also be present, as well as materials containing recurring —$OCH_2CH_2$— radicals. These products are also within the scope of this invention. Excellent results are obtained, however, when the brominated materials are predominantly ethoxylated dibromo-, tribromo- and tetrabromohydroquinone.

The ethoxylated brominated hydroquinones are prepared using known reaction techniques and the method of preparation of the material is not a critical aspect of this invention. Any known process for obtaining the ethoxylated polybromohydroquinones can be employed. In general dibromo-, tribromo- or tetrabromohydroquinone will be reacted with ethylene oxide or an ethoxylated hydroquinone, such as 2,2'-(p-phenylenedioxy)diethanol, will be brominated to the extent desired.

Conventional ethoxylation procedures and bromination techniques are employed for this purpose. The bromination can be conducted in a variety of solvents and mixed solvent systems including chloroform, methanol, and mixtures thereof, acetic acid and other known solvents which do not react with bromine but are a suitable solvent for the material being brominated. The ethoxylation procedure generally consists of reacting hydroquinone or the brominated hydroquinone with the appropriate amount of ethylene oxide in the presence of a basic catalyst, typically in a suitable solvent. Known basic catalysts, such as amines and alkali metal hydroxides can be employed. Triethylene diamine, sodium methoxide, sodium hydroxide and potassium hydroxide are useful catalysts for the ethoxylation. Generally the procedure involves dissolving the material to be ethoxylated in the solvent, charging the catalyst and removing any water that may be present either from the product or introduced as a result of the catalyst addition. The reaction mixture is then heated to about 150°C, vented to about 10 psig, and ethylene oxide fed into the reactor to a pressure of about 50 psig. As the ethylene oxide pressure decreases additional ethylene oxide is charged. The reaction is terminated when the calculated amount of ethylene oxide has reacted.

The ethoxylated brominated hydroquinones will constitute about 1 to 25% by weight of the total copolyester. Copolyesters having excellent physical characteristics, color and superior heat stability are obtained when about 5 to 15% by weight, based on the total composition, ethoxylated dibromo-, tribromo- or tetrabromohydroquinone is used. The amount of brominated material used is governed by the degree of flame retardance and other properties desired of the copolyester.

It is also possible to enhance the flame retardant and the other properties of the resulting copolyesters by the addition of other additives or reactants. For example, the hydroquinone compounds of this invention may be used in conjunction with other reactive brominated materials, such as brominated ethoxylated bisphenol A disclosed in U.S. Pat. No. 3,794,607, or other brominated diols or brominated diacids to obtain desirable results. It is also possible for certain applications to increase the flame resistance of the fibers and filaments by the addition of antimony oxide and other flame retardant additives, such as phosphorous-containing compounds. The amount of such materials, whether reactive or additive, will generally range from about 0.1 to about 10% by weight of the copolyester and more preferably from about 0.5 to 4% by weight.

The present ethoxylated brominated hydroquinones find particular utility in the modification of fiber-forming polyesters since by the use of these materials it is possible to obtain flame retardant copolyester fibers and filaments having improved color and heat stability. The brominated materials of this invention are useful comonomers (reactants) in the polymerization of bis(hydroxyethyl)terephthalate or the polymerization of ethylene glycol and terephthalic acid or dimethyl terephthalate for the formation of poly(ethylene terephthalate) copolyesters and in the reaction of 1,4-cyclohexanedimethanol with terephthalic acid (dimethyl terephthalate) or prepolymers thereof for the preparation of poly(1,4-cyclohexylenedimethylene terephthalate) copolyesters. In preparing the copolyesters it is recognized by those skilled in the art that terephthalic acid or the lower alkyl esters thereof can be used interchangeably with minor process modifications. Ester interchange processes of this type are widely employed typically with dimethyl terephthalate and ethylene glycol. The ethoxylated dibromo-, tribromo- or tetrabromohydroquinone may also be reacted with bis(hydroxyethyl)terephthalate prepolymer obtained from a prepolymerization step wherein ethylene glycol or ethylene oxide is reacted with terephthalic acid or dimethyl terephthalate. While the brominated ethoxylated hydroquinones may be charged at the outset of the polymerization it is not necessary and, as already indicated, the brominated reactant can be added to the reactor and reacted into the copolyester at any stage during the polymerization. It is convenient, however, in certain polymerizations, batch or continuous, to charge the brominated material after an initial prepolymerization step.

While the present invention is particularly directed ethylene glycol/terephthalic acid (ester)/ethoxylated brominated hydroquinone copolyesters and 1,4-cyclohexanedimethanol/terephthalic acid (ester)/ethoxylated brominated hydroquinone copolyesters, numerous other polyester and copolyester compositions are possible using these brominated materials. The ethoxylated polybromohydroquinones are useful for the preparation of polyesters obtained with any glycols of the general formula

wherein $x$ is an integer from about 2 to 10 such as ethylene glycol, which is a preferred glycol, 1,3- propanediol, 1,5-pentanediol, 1,6-hexanediol, 1,7-heptanediol, 1,8-octanediol, 1,9-nonanediol, 1,10-decanediol or the like. These glycols, and particularly the preferred glycols, ethylene glycol, and 1,4-cyclohexanedimethanol, are reacted with dicarboxylic acids or suitable esters thereof, preferably terephthalic acid or dimethyl terephthalate, but also including other dibasic acids such as isophthalic acid, adipic acid, sebacic acid, succinic acid, oxalic acid, glutaric acid, pimelic acid, suberic acid, azelaic acid and the like. In addition to being useful with polyesters derived from the more common diols and dicarboxylic acids, the brominated ethoxylated hydroquinones may also be used in combination with other reactants such as glycerol, sorbitol, pentaerythritol, methoxpolyethylene glycol, neopentyl glycol, monohydroxypivalate, trimethylolpropane, trimesic acid, p,p'-dicarboxydiphenylmethane, p,p'-dicarboxydiphenoxyethane, p-carboxyphenoxyphenoxyacetic acid and the like. Small amounts of these comonomers may be incorporated in the copolyester to alter one or more of the polymer properties. For example, small amounts of dibasic acids such as adipic acid, azelaic acid and dimer acids may be useful to improve the disperse dyeability of the copolyesters. Sulfonated isophthalic acid may be employed to improve the basic dyeing properties of the polymer. Other brominated diols or diacids may be included in copolyesters to further enhance the flame retardant properties.

In addition to modifying the copolyesters in the above manner, it is also possible and may often be more advantageous to blend the copolyester with suitable inorganic or organic additives, including other polyester or copolyester compositions. Such additives include oxidative, thermal and ultraviolet stabilizers, dyes, pigments, lubricants, antistatic agents, delusterants, additional flame retardants and the like. Such blending may be accomplished using conventional mixing equipment. Best results are most often obtained by melt blending.

While it is preferred that the ethoxylated dibromo-, tribromo- and tetrabromohydroquinones be reacted (chemically bound) into the polymer, it is nevertheless possible to blend these materials with polyesters and still obtain improved properties. In this regard, the brominated ethoxylated hydroquinone can be charged near the end of the polymerization in order that some of the material is reacted into the copolyester while some remains unreacted but physically admixed therewith. For reasons of durability (permanence), however, since most polyester fabrics undergo numerous washings and/or drycleanings, it is preferred that the bulk of the ethoxylated brominated hydroquinone be reacted into the copolyester.

Conventional polymerization procedures can be employed with the brominated ethoxylated hydroquinones to obtain high molecular weight copolyesters suitable for fibers and filaments. Reaction conditions and catalysts are those described in the art. The polymerization can be conducted in a batch, continuous or semi-continuous manner. Numerous modifications of the process are possible including varying the reactants, the catalyst, reaction temperature and pressure, the ratio of reactants and the manner in which the various reactants and catalysts are charged to the reactor or reaction zone. Numerous polymerization techniques for the production of polyester and copolyesters are reported and are adaptable to the present invention, as will be recognized by those skilled in the art.

The following examples serve to illustrate the invention more fully, however, they are not intended to limit the scope thereof. In the examples all percentages and parts are reported on a weight basis unless otherwise indicated.

EXAMPLE I

Ethoxylated dibromohydroquinone was obtained by first ethoxylating the hydroquinone and then brominating the ethoxylated product. The ethoxylation was carried out in methanol at a pressure of approximately 50 psig and 90°C using sodium methoxide as a catalyst. When 2 mols ethylene oxide were reacted per mol of hydroquinone the reaction was terminated and the product recovered. The hydroquinone di-($\beta$-hydroxyethyl) ether was obtained in 85% yield (99% pure based on GLC analysis).

One and one-half mols of the above product was charged to a reaction vessel containing a chloroform/methanol mixture (7:1 by volume) and 3.4 mols bromine was added drop-wise at such a rate that the temperature of the reaction mixture was maintained below 45°C. When the addition was complete the mixture was refluxed for 3 hours after which time the solid product was recovered by filtration and washed with aqueous sodium bisulfite and finally water. A 75.5% yield of the ethoxylated dibromohydroquinone melting at 145°–148° C and containing 44.8% bound bromine was obtained.

In a similar manner the bromination of ethoxylated hydroquinone was accomplished in acetic acid at 60° C. An 88.6% yield of 1,4-bis(acetoxyethosy)-2,5-dibromobenzene (m.p. 138°–140°C) was obtained. This product was saponified using aqueous potassium hydroxide by refluxing at 100° C for 3 hours to obtain a nearly quantitive yield of the ethoxylated dibromohydroquinone (m.p. 144.5°–145.5°C).

EXAMPLE II

Using a procedure similar to that described in Example I, 27.5 grams hydroquinone was added to a mixed solvent consisting of 300 mls chloroform and 75 mls methanol. 160 grams bromine was added drop-wise with stirring over a period of 1.5 hours while maintaining the temperature between about 25° and 40° C. At the completion of the bromine addition, the reaction mixture was refluxed for one hour at 53°C and then allowed to cool. The recovered precipitate was washed several times with methanol and dried. This product, obtained in 58% yield after purification, contained about 74% bound bromine and melted at about 250° C.

The tetrabromo hydroquinone product prepared above was ethoxylated in methanol at 66°C and about 50 psig using sodium methoxide catalyst. When 2 mols ethylene oxide were reacted per mol tetrabromo hydroquinone the reaction was terminated and the product recovered. The crude product had slight discoloration, contained 61% bromine (theory 62.4%) and had a melting point of about 204°C. Upon recrystallization from methanol the color of the ethoxylated tetrabromohydroquinone was significantly improved.

In a similar manner to that described in Example I ethoxylated hydroquinone obtained by the reaction of 2 mols ethylene oxide and one mol hydroquinone was brominated. The resulting product contained 59.4% bound bromine and had good color.

EXAMPLE III

Preparation of bis(hydroxyethyl)terephthalate prepolymer — 600 Grams dimethyl terephthalate and 423 grams ethylene glycol were charged to a reactor with 0.96 grams calcium acetate dihydrate catalyst. The reaction mixture was heated under nitrogen to about 220°C until about 250 mls methanol were recovered. The bis(hydroxyethyl)terephthalate prepolymer, containing about 5% excess ethylene glycol, was then poured from the reactor, allowed to cool and ground in a blender for subsequent use.

EXAMPLE IV

Copolyester preparation — 2.5 Grams of the ethoxylated dibromhydroquinone of Example I and 55 grams of the above-prepared bis(hydroxyethyl)terephthalate prepolymer were charged to a reaction vessel with 18 milligrams antimony trioxide. The reaction mixture, maintained under an inert atmosphere of nitrogen, was heated at about 225°C for about 20 minutes to remove the last traces of methanol and the temperature then raised to about 280°–285°C. The pressure in the reactor was gradally reduced to 0.6 mm Hg. and maintained at this pressure or below while the polymerization was continued for about 3 hours. The resulting copolyester melt had only very slight coloration at the end of the polymerization period.

Additional polymers were prepared using the above procedure but varying the amount of ethoxylated dibromohydroquinone. In one such series, copolyesters containing 2.3, 4.7 and 7.0% bromine were prepared and evaluated for flame retardance and other properties.

EXAMPLE V

Following a procedure similar to that described in Example IV a high molecular weight of ethoxylated tetrabromohydroquinone was prepared. For this polymerization 55 grams bis(hydroxyethyl)terephthalate prepolymer and 3.6 grams ethoxylated tetrabromohydroquinone were polymerized using antimony trioxide catalyst.

EXAMPLE VI

A copolyester was prepared employing a unit charge of 31 grams dimethyl terepthalate, 23.6 grams ethylene glycol, 3.7 grams ethoxylated dibromohydroquinone and a mixed catalyst comprised of 0.05 grams calcium acetate dihydrate and 0.012 grams antimony trioxide. The reactor and its contents were heated at 197°C in an ethylene glycol vapor bath under a slow stream of nitrogen for 3 hours to remove the methanol. The polymerization vessel was then transferred to a 222°C vapor bath heated for 20 minutes, then transferred to a 283°C vapor bath (dimethyl phthalate) heated for 10 minutes, the pressure reduced to 1 mm Hg. over a 15 minute period and the polymerization continued for about 2½ hours. The resulting copolyester composition had good color, contained 5.0% bromine and had a melt point of 240°C.

Copolyesters containing different weight levels bromine were prepared in accordance with the above examples and evaluated to determine the melting points, viscosity, thermal stability and flame retardance of the compositions. Results are reported in the table below. Melt points were determined using a differential scanning calorimeter (DSC). The viscosity (reduced viscosity) was determined by dissolving 0.1 gram of the copolyester in 16.6 mls 1,1,2,2-tetrachloroethane/phenol (40/60) solvent and then measuring the flow time of the solution at 30°C with an Ostwald viscometer. The reduced viscosity was calculated from the formula $$\eta \text{red} = \frac{\frac{t_s}{t_o} - 1}{c}$$

where $\eta\text{red}$ = inherent viscosity
$t_s$ = flow time of the solution
$t_o$ = flow time of the solvent
$c$ = concentration of the solution (grams/dl.)

Thermal stability of the copolyesters was measured by thermal gravimetric analysis by heating a sample in a nitrogen atmosphere (70 ml per minute) at a rate of 10°C per minute and observing the temperature at which initial decomposition occurs and thereafter measuring the weight loss due to decomposition with time. The flame retardance is determined with a General Electric Flammability Index Tester in accordance with the oxygen index test method (ASTM D2863-70). The oxygen index is the minimum concentration of oxygen in a mixture of oxygen and nitrogen that will support combustion of a sample. The higher the oxygen index the better the flame retardancy. Samples were prepared by placing 5.5 grams of the copolyester and a fiberglass strip (1×8 cm) in a heavy aluminum foil mold and placing on a hot plate until the copolyester was melted. Upon cooling these test specimens were then clamped in upright position at the bottom of a vertical glass chimney and ignited at the upper end with a flame. The oxygen/nitrogen mixture was passed through the chimney — if the sample continued to burn for a specified time the oxygen content in the mixture was reduced and the procedure repeated until the mixture no longer supported combustion. The oxygen index rating is then calculated as follows $$\text{Oxygen Index} = \frac{(O_2 \text{ volume}) \times 100}{(O_2 \text{ volume}) + (N_2 \text{ volume})}$$

and the average of four samples reported. In the table, results are reported for copolyesters obtained by the polymerization of bis(hydroxyethyl)terephthalate and ethoxylated dibromohydroquinone and ethoxylated tetrabromohydroquinone. Samples A, B, and C are copolyesters containing 4.6, 8.8 and 12.6 weight % ethoxylated dibromohydroquinone, respectively. Sample D contains 6.5 weight % ethoxylated tetrabromohydroquinone. Sample E is poly(ethylene terephthalate) containing no brominated material.

| SAMPLE | %Br | MELTING POINT (°C) | OXYGEN INDEX | % WEIGHT LOSS (350°) | REDUCED VISCOSITY |
|---|---|---|---|---|---|
| A | 2.3 | 255 | 23.5 | 1 | 0.40 |
| B | 4.7 | 246 | 25.1 | 1 | 0.45 |
| C | 7.0 | 238 | 26.3 | 0.5 | 0.43 |
| D | 4.7 | 254 | 25.4 | 0.5 | 0.20 |
| E | 0 | 261 | 22.8 | 1 | 0.40 |

The thermal stability of the copolyesters is particularly surprising in view of the results obtained when the ethoxylated dibromohydroquinone and ethoxylated tetrabromonhydroquinone compounds are subjected to thermal gravimetric analysis using the same conditions. Initial decomposition of the dibromo material begins at about 185° and at 250° C at 10% weight loss is already observed. At 300°C about 70% of the ethoxylated dibromohydroquinone has decomposed. Initial decomposition of the ethoxylated tetrabromohydroquinone begins at about 200°C, at 300°C 40% of the material is lost and at about 320°C the compound is entirely decomposed. By incorporating these brominated materials into copolyesters their thermal stability is markedly enhanced so that essentially no decomposition is noted below 350°C, in face, even as high as 400°C only about 5% decomposition results.

Fibers and filaments of these copolyesters are prepared using conventional procedures such as melt extrusion. These fibers can be orientated by drawing and they can be heat set by heating the elongated fiber. The orientated fibers have excellent physical properties and may be employed in conventional applications. The fibers of the invention may be used in any state of aggregation, e.g., as monofilaments, flocks, yarns, tows, or cords, and they are readily knitted or woven. They may be used in textile applications by themselves or in blends containing about 25 to 65% by weight of the copolyester and 75 to 35% by weight of another fiber such as cotton, nylon and other polyesters. Extremely useful blends are obtained when the copolyesters are blended with cotton. Blends with fibers having elastic properties to obtain stretch fabrics may also be prepared. The present copolyesters find particular utility in wearing apparel, draperies and carpeting.

We claim:

1. A flame retardant, thermally stable, fiber-forming copolyester comprising the condensation product of (a) a diol, (b) a dicarboxylic acid or a lower alkyl ester thereof and (c) a brominated ethoxylated hydroquinone of the formula

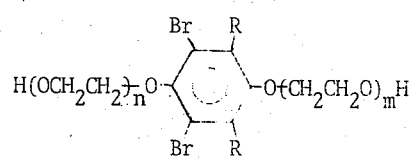

wherein R is hydrogen or bromine and n and m are integers from 1 to 4, said brominated ethoxylated hydroquinone comprising about 1 to 25% by weight of the copolyester composition.

2. The copolyester of claim 1 wherein $n$ and $m$ of the brominated ethoxylated hydroquinone are the same and equal to 1.

3. The copolyester of claim 1 wherein (a) is selected from the group consisting of glycols of the formula $HO-(CH_2)_x-OH$ where $x$ is an integer from 2 to 10 and 1,4-cyclohexanedimethanol and (b) is selected from the group consisting of terephthalic acid and dimethyl terephthalate.

4. The copolyester of claim 3 wherein (c) has the formula

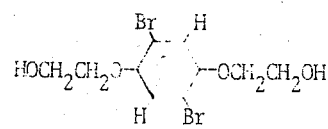

5. The copolyester of claim 3 wherein (c) has the formula

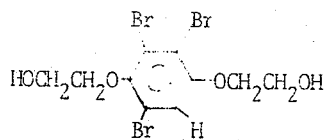

6. The copolyester of claim 3 wherein (c) has the formula

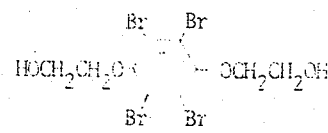

7. The copolyester of claim 3 wherein (a) is ethylene glycol and (c) constitutes 5 to 15% by weight of the copolyester composition.

8. The copolyester of claim 3 wherein (a) is 1,4-cyclohexanedimethanol and (c) constitutes 5 to 15% by weight of the copolyester composition.

* * * * *

UNITED STATES PATENT AND TRADEMARK OFFICE
CERTIFICATE OF CORRECTION

PATENT NO. : 3,887,523
DATED : June 3, 1975
INVENTOR(S) : Chiou C. Yau; Irwin S. Schlossman; Herman F. Oehlschlaeger It is certified that error appears in the above-identified patent and that said Letters Patent are hereby corrected as shown below:

Col. 2, line 42, "hydroxy-ethoxy" should read ---hydroxyethoxy---.
Col. 5, line 15, "methoxpolyethylene" should read ---methoxypolyethylene---.
Col. 6, line 34, "acetoxyethosy" should read ---acetoxyethoxy---.
Col. 9, line 4, "tetrabromonhydroquinone" should read
 ---tetrabromohydroquinone---; line 16, "face" should read ---fact---.
Claim 1, line 6, the structural formula

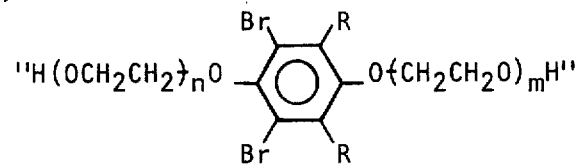

should read

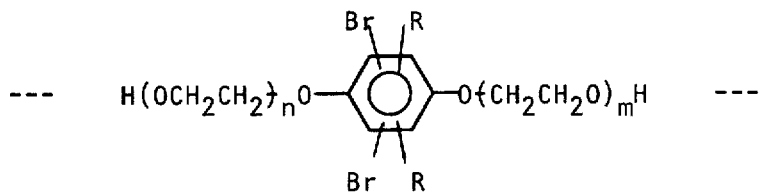

Signed and Sealed this

Tenth Day of April 1979

[SEAL]

Attest:

RUTH C. MASON
Attesting Officer

DONALD W. BANNER
Commissioner of Patents and Trademarks